US012776673B2

(12) United States Patent
Hu et al.

(10) Patent No.: US 12,776,673 B2
(45) Date of Patent: Oct. 27, 2026

(54) MOTOR ROTOR, SELF-STARTING SYNCHRONOUS RELUCTANCE MOTOR, AND COMPRESSOR

(71) Applicant: GREE ELECTRIC APPLIANCES, INC. OF ZHUHAI, Zhuhai (CN)

(72) Inventors: Yusheng Hu, Zhuhai (CN); Bin Chen, Zhuhai (CN); Yong Xiao, Zhuhai (CN); Xia Li, Zhuhai (CN); Jinfei Shi, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 198 days.

(21) Appl. No.: 18/775,418

(22) Filed: Jul. 17, 2024

(65) Prior Publication Data

US 2024/0372422 A1 Nov. 7, 2024

Related U.S. Application Data

(63) Continuation of application No. PCT/CN2022/126906, filed on Oct. 24, 2022.

(30) Foreign Application Priority Data

Jan. 26, 2022 (CN) ......................... 202210092265.3

(51) Int. Cl.
*H02K 1/24* (2006.01)
*H02K 19/14* (2006.01)

(52) U.S. Cl.
CPC ............. *H02K 1/246* (2013.01); *H02K 19/14* (2013.01); *H02K 2201/03* (2013.01); *H02K 2213/03* (2013.01)

(58) Field of Classification Search
CPC .......... H02K 1/246; H02K 1/22; H02K 19/14; H02K 2201/03; H02K 2213/03
(Continued)

(56) References Cited

U.S. PATENT DOCUMENTS 5,831,367 A * 11/1998 Fei ......................... H02K 1/246 310/216.107
2006/0108888 A1* 5/2006 Jung ...................... H02K 1/246 310/211

(Continued)

FOREIGN PATENT DOCUMENTS

CN 106104970 A 11/2016
CN 106537728 A 3/2017

(Continued)

OTHER PUBLICATIONS

Machine translation of CN-109309414-B. (Year: 2021).*

(Continued)

*Primary Examiner* — Michael Andrews
(74) *Attorney, Agent, or Firm* — Christensen O'Connor Johnson Kindness PLLC

(57) ABSTRACT

Provided are a motor rotor, a self-starting synchronous reluctance motor, and a compressor. The motor rotor includes a rotor core. The rotor core includes a first rotor lamination, filling slots and rotor slots are formed in the first rotor lamination, the filling slots include second filling slots and first filling slots, multiple magnetic barrier layers are arranged on the first rotor lamination at intervals along a q-axis, the multiple magnetic barrier layers include two outer magnetic barrier layers and multiple inner magnetic barrier layers arranged between the two outer magnetic barrier layers, each outer magnetic barrier layer includes one first filling slot, each inner magnetic barrier layer includes one rotor slot, and second filling slots arranged at two ends of the rotor slot, respectively. In the same inner magnetic barrier layer, separating ribs each are arranged between the rotor slot and each of the second filling slots.

18 Claims, 10 Drawing Sheets

(58) Field of Classification Search
USPC .............................................. 310/162, 156.53
See application file for complete search history.

(56) References Cited

U.S. PATENT DOCUMENTS

| | | | | |
|---|---|---|---|---|
| 2020/0280224 | A1* | 9/2020 | Huang | H02K 1/246 |
| 2024/0380294 | A1* | 11/2024 | Chen | H02K 19/14 |

FOREIGN PATENT DOCUMENTS

| | | | | | |
|---|---|---|---|---|---|
| CN | 110112846 | A | | 8/2019 | |
| CN | 110149015 | A | | 8/2019 | |
| CN | 109309414 | B | * | 6/2021 | H02K 1/22 |
| CN | 113964969 | A | | 1/2022 | |
| CN | 113964971 | A | | 1/2022 | |
| CN | 113964972 | A | | 1/2022 | |
| CN | 114598060 | A | | 6/2022 | |
| CN | 216851465 | U | | 6/2022 | |
| EP | 3923449 | A1 | * | 12/2021 | H02K 1/246 |
| EP | 3923450 | A1 | | 12/2021 | |
| JP | 2001186735 | A | | 7/2001 | |
| JP | 2020025380 | A | | 2/2020 | |

OTHER PUBLICATIONS

1st Office Action dated Aug. 19, 2025, issued in corresponding No. JP2024540671, filed Oct. 31, 2024, 9 pages.

2nd Office Action dated Nov. 11, 2025, issued in corresponding No. JP2024540671, filed Oct. 31, 2024, 10 pages.

International Search Report and Written Opinion mailed Jan. 18, 2023, issued in corresponding International Application No. PCT/CN2022/126906, filed Oct. 24, 2022, 14 pages.

Extended European Search Report mailed Mar. 3, 2025, issued in corresponding European Application No. EP22923346.5, filed Oct. 24, 2022, 10 pages.

Office Action mailed Jan. 15, 2026, in corresponding Chinese application No. 2022100922653, filed Jan. 26, 2022, 17 pages.

* cited by examiner

MOTOR ROTOR, SELF-STARTING SYNCHRONOUS RELUCTANCE MOTOR, AND COMPRESSOR

CROSS-REFERENCE TO RELATED APPLICATIONS

The present application is a continuation application of PCT Patent Application No. PCT/CN2022/126906, filed on Oct. 24, 2022, which claims the priority of the Chinese patent application No. 202210092265.3, filed with China National Intellectual Property Administration on Jan. 26, 2022 and entitled "MOTOR ROTOR, SELF-STARTING SYNCHRONOUS RELUCTANCE MOTOR, AND COMPRESSOR", the entire contents of which are incorporated herein by reference.

TECHNICAL FIELD

The present invention relates to the technical field of motors, and in particular to a motor rotor, a self-starting synchronous reluctance motor, and a compressor.

BACKGROUND

A self-starting synchronous reluctance motor combines the advantages of an asynchronous motor on the basis of a synchronous reluctance motor, and realizes a self-starting through an asynchronous torque generated by a rotor bar, without being driven by a frequency converter. Compared with the asynchronous motor, the motor can achieve an operation at a constant speed, low rotor loss, and improved efficiency during a synchronous operation. Compared with the asynchronous starting permanent magnet synchronous motor, the motor needs no permanent magnet materials, thus having a low cost, and does not have a problem of permanent magnet demagnetization. However, the self-starting synchronous reluctance motor has a problem of a relatively large harmonic due to a structure of multiple magnetic barrier layers thereof.

SUMMARY

Therefore, the present invention provides a motor rotor, a self-starting synchronous reluctance motor, and a compressor, which can overcome the disadvantage of a relatively large harmonic of a self-starting synchronous reluctance motor in the related art due to a motor rotor thereof having a structure of multiple magnetic barrier layers.

In order to solve the above problem, the present invention provides a motor rotor, including a first rotor lamination, filling slots and rotor slots are formed in the first rotor lamination, the filling slots include second filling slots and first filling slots, multiple magnetic barrier layers are arranged on the first rotor lamination at intervals along a q-axis, the multiple magnetic barrier layers include two outer magnetic barrier layers and multiple inner magnetic barrier layers arranged between the two outer magnetic barrier layers, each outer magnetic barrier layer includes one first filling slot; each inner magnetic barrier layer includes one rotor slot, and two second filling slots arranged at two ends of the rotor slot, respectively. In the same inner magnetic barrier layer, separating ribs each are arranged between the rotor slot and each of the second filling slots. An axial plane, where a side of each separating rib adjacent to a rotor outer circle is located, has one center point. L denotes a d-axial distance between two center points corresponding to two separating ribs in any two adjacent magnetic barrier layers, and W denotes the maximum q-axial dimension of a magnetic channel formed between the filling slots in the two adjacent magnetic barrier layers, and it is satisfied that $0 \leq L < 2W$.

In some embodiments, $0 \leq L < W$.

In some embodiments, $0 \leq L \leq 0.8W$.

In some embodiments, L1 denotes a d-axial width of a separating rib in an inner magnetic barrier layer adjacent to a corresponding first filling slot; the first rotor lamination has a shaft hole; L2 denotes a d-axial width of a separating rib in an inner magnetic barrier layer adjacent to the shaft hole; and L1 is not less than L2, and it is satisfied that $L1 \geq 0.5\sigma$.

In some embodiments, the axial plane, where the side of each separating rib adjacent to the rotor outer circle is located, has the center point; k7 denotes a d-axial distance between two center points corresponding to separating ribs in the outermost inner magnetic barrier layer adjacent to the rotor outer circle and in an adjacent inner magnetic barrier layer thereof, respectively; k8 denotes a d-axial distance between two center points corresponding to separating ribs in the outermost inner magnetic barrier layer adjacent to the rotor outer circle and in the innermost magnetic barrier layer adjacent to a shaft hole of the rotor, respectively; and it is satisfied that $0 \leq k7/k8 \leq 0.6$.

In some embodiments, the filling slots are located at an outer circumference of the rotor; L3 denotes an interval between each second filling slot of an innermost magnetic barrier layer adjacent to a shaft hole and the rotor outer circle; L4 denotes an interval between each first filling slot of each outer magnetic barrier layer adjacent to the rotor outer circle and the rotor outer circle, and $L4 \geq L3$ and $0 \leq L3 \leq 2.5\sigma$ are satisfied.

In some embodiments, the maximum q-axial width of an end portion of each filling slot adjacent to the rotor outer circle is not greater than the maximum q-axial width of a region of the filling slot adjacent to the q-axis of the rotor.

In some embodiments, a width deviation of q-axial widths of each filling slot from the rotor outer circle to the q-axis of the rotor is not greater than 5%.

In some embodiments, a ratio of the maximum q-axial width to the minimum q-axial width of each filling slot is $\tau$, and $1 \leq \tau \leq 2$.

In some embodiments, maximum d-axial widths of the second filling slots of the inner magnetic barrier layers gradually increase along a q-axis direction from the rotor outer circle to a center of a shaft hole.

In some embodiments, the maximum d-axial widths of the second filling slots of at least three layers continuously increase along the q-axis direction from the rotor outer circle to the center of the shaft hole; and/or the maximum d-axial widths of the second filling slots, which are in magnetic barrier layers from the second inner magnetic barrier layer adjacent to a d-axis to an inner magnetic barrier layer adjacent to the rotor outer circle, continuously decrease along the q-axis from the center of the shaft hole to the rotor outer circle.

In some embodiments, each rotor slot includes a curved segment and/or a straight segment; curvature radii of curved segments of the rotor slots become larger gradually in a direction from a shaft hole to the rotor outer circle; in the same layer, a curvature radius of an outer arc of each rotor slot is greater than a curvature radius of an inner arc of the rotor slot, and the curved segment protrudes in the direction from the shaft hole to the rotor outer circle; or two ends of a rotor slot extend toward the rotor outer circle in a direction parallel to a d-axis to form straight segments respectively;

two ends of each of or part of the rotor slots are parallel to the d-axis, and q-axial widths of each rotor slot gradually increase from the middle of the rotor slot toward two ends thereof.

In some embodiments, in the direction from the center of the shaft hole to the rotor outer circle along the q-axis, the q-axial widths of the rotor slots of at least three layers decrease continuously, a q-axial width of a rotor slot is m2, a q-axial width of the first filling slot is m1, a sum of the q-axial widths of all rotor slots and the first filling slot is $(m1+\Sigma m2)$; a width from a hole wall of the shaft hole to the outer circle of the first rotor lamination is m3, and it is satisfied that $(m1+\Sigma m2)/m3=0.2$ to 0.5.

In some embodiments, among the filling slots formed in the first rotor lamination, at least five filling slots have different filling areas, and/or a total filling area of the first filling slots and the second filling slots accounts for 30% to 70% of a total cross-sectional area of the first filling slots, the second filling slots and the rotor slots.

In some embodiments, the minimum width of a magnetic channel between two adjacent filling slots each in two adjacent magnetic barrier layers respectively is W1, and $W1 \geq d$, where, d denotes the minimum width of the magnetic channel between two rotor slots each in the two adjacent magnetic barrier layers respectively.

In some embodiments, $W1/d>1.15$.

In some embodiments, the minimum q-axial dimension of a magnetic channel between two adjacent rotor slots each in two adjacent magnetic barrier layers respectively is h1, and $h1 \geq 1.5h2$, where h2 denotes the minimum q-axial width of one magnetic barrier layer, whose rotor slot, among the rotor slots each in the two adjacent magnetic barrier layers respectively, has a smaller q-axial width.

In some embodiments, a d-axial width of each first filling slot is less than a d-axial width between ends of two second filling slots in an adjacent magnetic barrier layer, wherein the ends of the two second filling slots are adjacent to the rotor slot respectively.

In some embodiments, a ratio of a q-axial distance L5 between an inner wall of a first filling slot and a rotor center to a radius Rr of the rotor satisfies $0.82 \leq L5/Rr \leq 0.96$.

In some embodiments, a ratio of a q-axial distance between respective sides of two innermost magnetic barrier layers adjacent to a shaft hole to a q-axial width of a rotation shaft of the rotor is greater than 1.2; and/or a ratio of a diameter of a curved segment of a side of an innermost magnetic barrier layer adjacent to a shaft hole to a q-axial width of the rotation shaft is greater than 2.

In some embodiments, the maximum q-axial thickness of each first filling slot is k, and the maximum q-axial thickness of each second filling slot in an adjacent magnetic barrier layer of the first filling slot is k1, and the minimum q-axial thickness of a magnetic channel connected to the first filling slot is k2, and it is satisfied that $1<k/k1 \leq 2$, and/or, $0.8<k/k2 \leq 1.6$.

In some embodiments, magnetic channels each are formed between two adjacent magnetic barrier layers, and in a direction from a center of a shaft hole to the rotor outer circle along the q-axis, q-axial widths of the magnetic channels decrease gradually.

In some embodiments, in the direction from the center of the shaft hole to the rotor outer circle along the q-axis, the q-axial widths of magnetic channels of at least three layers decrease continuously; and/or the magnetic channels each are formed between two adjacent magnetic barrier layers, and for a magnetic channel consisting of curved segments and straight segments, in directions from the q-axis to two sides of the q-axis respectively, widths of the magnetic channel gradually increase.

In some embodiments, in each magnetic barrier layer, a ratio of a width of a portion of the rotor slot located at a position where the q-axis is located, to a width of an end of the rotor slot adjacent to a corresponding filling slot is $\tau 1$, and from the innermost inner magnetic barrier layer to the outermost inner magnetic barrier layer, ratios $\tau 1$ gradually increase.

In some embodiments, in each inner magnetic barrier layer, a ratio of the maximum q-axial width of each filling slot to a q-axial width of the rotor slot is $\tau 2$, and $\tau 2>1.4$.

In some embodiments, k3 denotes a d-axial width between ends of the two second filling slots, which are located at and adjacent to two ends of the rotor slot in a sub-outer inner magnetic barrier layer adjacent to the rotor outer circle respectively; k4 denotes a d-axial width between ends of the two second filling slots, which are located at and adjacent to two ends of the rotor slot in an adjacent inner magnetic barrier layer thereof adjacent to a shaft hole respectively, and it is satisfied that $0.5 \leq k3/k4 \leq 1$ or $0.5 \leq k4/k3 \leq 1$.

In some embodiments, k5 denotes a d-axial width between ends of the two second filling slots, which are located at and adjacent to two ends of a rotor slot in an outmost layer adjacent to the rotor outer circle respectively; k6 denotes a d-axial width between ends of the two second filling slots, which are located at and adjacent to two ends of a rotor slot in an innermost layer adjacent to the shaft hole respectively, and it is satisfied that $0.5 \leq k5/k6 \leq 1$ or $0.5 \leq k6/k5 \leq 1$.

In some embodiments, an angle formed between straight lines connecting a center of the rotor and two ends of a first filling slot respectively is $\alpha 1$, and $20° \leq \alpha 1 \leq 60°$ is satisfied; and/or the number of the first filling slots is n, and $n \geq 1$; and/or a parallelism deviation between a length extension direction of each filling slot and a d-axis does not exceed 5%.

In some embodiments, the maximum q-axial width of a shaft hole in the first rotor lamination is not greater than the maximum d-axial width thereof; and/or, the shaft hole is composed of curved segments and/or straight segments.

In some embodiments, the rotor core further includes a second rotor lamination, and the second rotor lamination is arranged between an end ring and the first rotor lamination; and through slots are formed in the second rotor lamination at positions corresponding to the filling slots respectively.

In some embodiments, the maximum width of an outer contour of the second rotor lamination is not greater than a diameter of the outer circle of the first rotor lamination, and the maximum q-axial width of an inner hole of the second rotor lamination is not less than the maximum d-axial width thereof; and/or an axial thickness of the second rotor lamination is not less than a thickness of a single-piece first rotor lamination.

In some embodiments, a ratio of the maximum q-axial width of the inner hole of the second rotor lamination to the maximum d-axial width thereof is in a range from 1 to 1.5.

In some embodiments, a q-axial radial width, among radial widths each between the inner hole of the second rotor lamination and an outer circle thereof, is the smallest, and a d-axial radial width kd2 of the second rotor lamination and the q-axial radial width kq2 of the second rotor lamination satisfy $1.1 \leq kd2/kq2 \leq 2.8$.

In some embodiments, $1.2 \leq kd2/kq2 \leq 1.8$.

In some embodiments, a total cross-sectional area of the through slots in the second rotor lamination is less than or equal to a total cross-sectional area of the filling slots in the first rotor lamination.

In some embodiments, the through slots formed in the second rotor lamination are disposed at positions corresponding to the filling slots formed in the first rotor lamination, and a cross-sectional area of a single through slot in the second rotor lamination is not greater than a cross-sectional area of a single filling slot at a corresponding position in the first rotor lamination.

In some embodiments, a d-axial width between an inner hole and each through slot of the second rotor lamination is greater than a d-axial width of a corresponding separating rib between the through slot and a corresponding rotor slot.

In some embodiments, a total cross-sectional area of the rotor slots of the first rotor lamination within an inner circumference of an inner hole of the second rotor lamination accounts for at least 20% of a total circulation area of circulation slots of a motor; and/or the total cross-sectional area of the rotor slots of the first rotor lamination within the inner hole of the second rotor lamination accounts for at least 30% of the total cross-sectional area of the rotor slots.

In some embodiments, the total cross-sectional area of the rotor slots of the first rotor lamination within the inner circumference of the inner hole of the second rotor lamination accounts for 25% to 40% of the total circulation area of the circulation slots of the motor; and/or the total cross-sectional area of the rotor slots of the first rotor lamination within the inner hole of the second rotor lamination accounts for 45% to 65% of the total cross-sectional area of the rotor slots.

In some embodiments, along a direction from a center of a shaft hole of the rotor to the rotor outer circle, cross-sectional areas of the rotor slots in the magnetic barrier layers on the first rotor lamination within an inner circumference of an inner hole of the second rotor lamination gradually decrease.

In some embodiments, the maximum width of an outer contour of the end ring is not greater than the maximum width of an outer contour of the second rotor lamination, and the maximum distance from a center of a shaft hole of the rotor to an end face of the end ring is not less than the maximum distance from the center of the shaft hole of the rotor to an end face of the second rotor lamination; and/or a d-axial radial width between an inner hole and an outer circle of the end ring is k9, and a q-axial radial width therebetween is k10, and it is satisfied that $1.1 \le k9/k10 \le 2.8$.

In some embodiments, $1.2 \le k9/k10 \le 1.8$.

In some embodiments, a balancing block is arranged on the end ring, and the balancing block is located on a side having a larger radial width between an inner hole and an outer circle of the end ring.

In some embodiments, at least part of the filling slots are filled with conductive and non-magnetic material, and are shorted by end rings arranged at two ends of the second rotor lamination respectively to form a squirrel-cage.

In some embodiments, the first rotor lamination is divided into four quadrants by a d-axis and the q-axis divide based on a center of a shaft hole; in the first quadrant, kd1 denotes the minimum distance from a geometric center of a separating rib to the d-axis, and kq1 denotes the minimum distance from the geometric center of the separating rib to the q-axis, it is satisfied that $kq1 = -v \times kd1 + \lambda$, wherein $0.28 \le v \le \le 0.46$, and $28 \le \lambda \le 33$.

The present invention further provides a self-starting synchronous reluctance motor, including a stator and the motor rotor above.

In some embodiments, after the rotor core is assembled with a corresponding stator, a width of an air gap formed between the rotor core and the stator is $\sigma$, and $0 \le L < 8\sigma$.

In some embodiments, $0 \le L \le 6\sigma$.

In some embodiments, from a shaft hole to the rotor outer circle, lengths of curves each between ends of a rotor slot adjacent to the two second filling slots in each layer decrease gradually, and the lengths of the curves of adjacent rotor slots decrease by a ratio from 5% to 25%; and/or a d-axial width of each separating rib is L2, and $L2 \ge 0.5\sigma$, wherein a denotes a width of an air gap formed between the rotor core and the stator.

The present invention further provides a compressor, including the self-starting synchronous reluctance motor above.

The present invention provides the motor rotor, the self-starting synchronous reluctance motor, and the compressor. The minimum distance between the filling slots of the rotor is limited, such that on the one hand, the saturation of the magnetic channel between the filling slots is reduced, and on the other hand, the relative positions of the magnetic channel and the stator teeth are staggered, which has beneficial effects of reducing the motor harmonics, reducing the torque ripples, reducing the harmonic losses, and improving the efficiency and operational stability of the motor.

REFERENCE SIGNS ARE AS FOLLOWS

Figure 1:
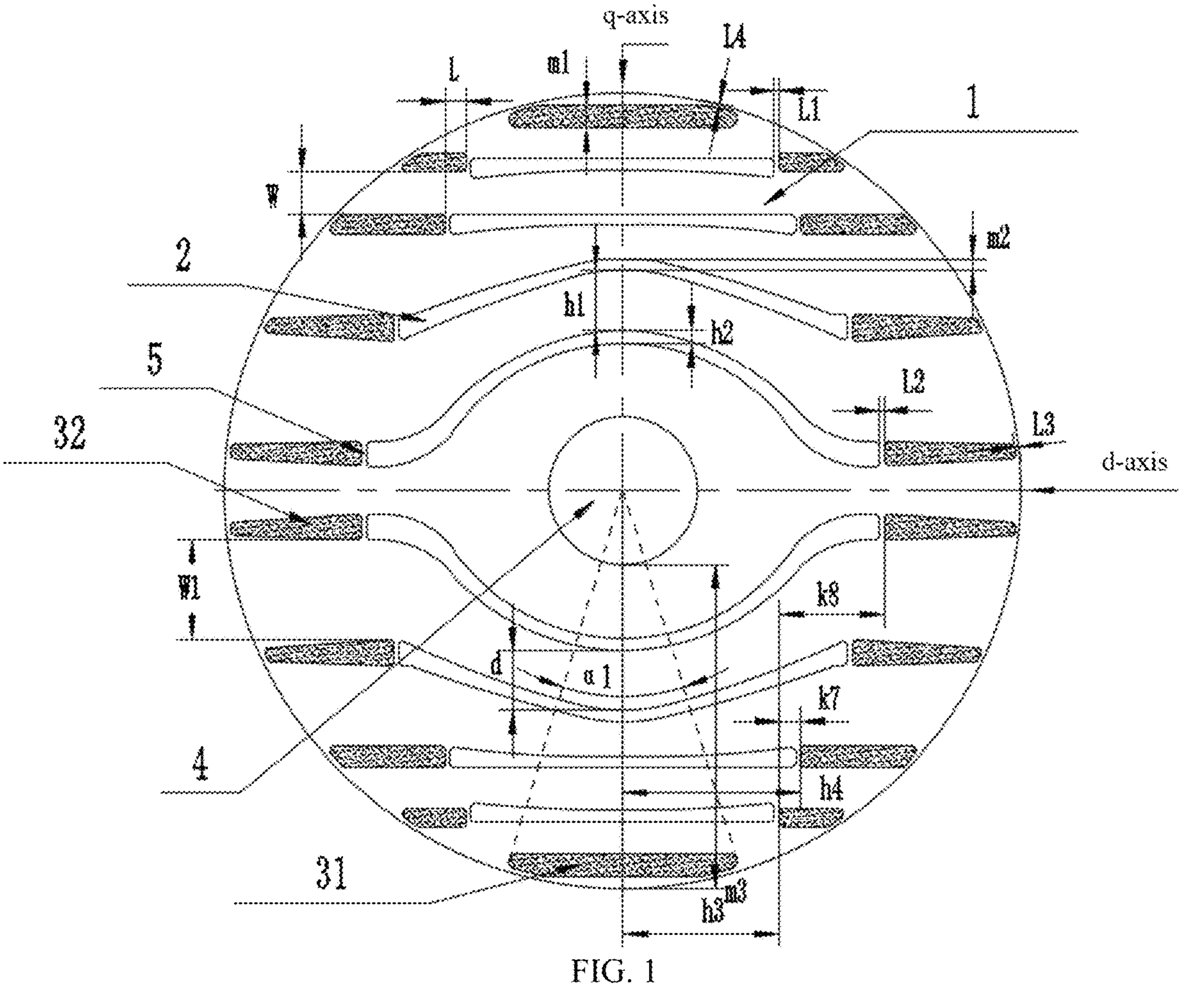
FIG. 1 is a schematic view showing an axial structure of a first rotor lamination of a motor rotor according to an embodiment of the present invention.
Figure 2:
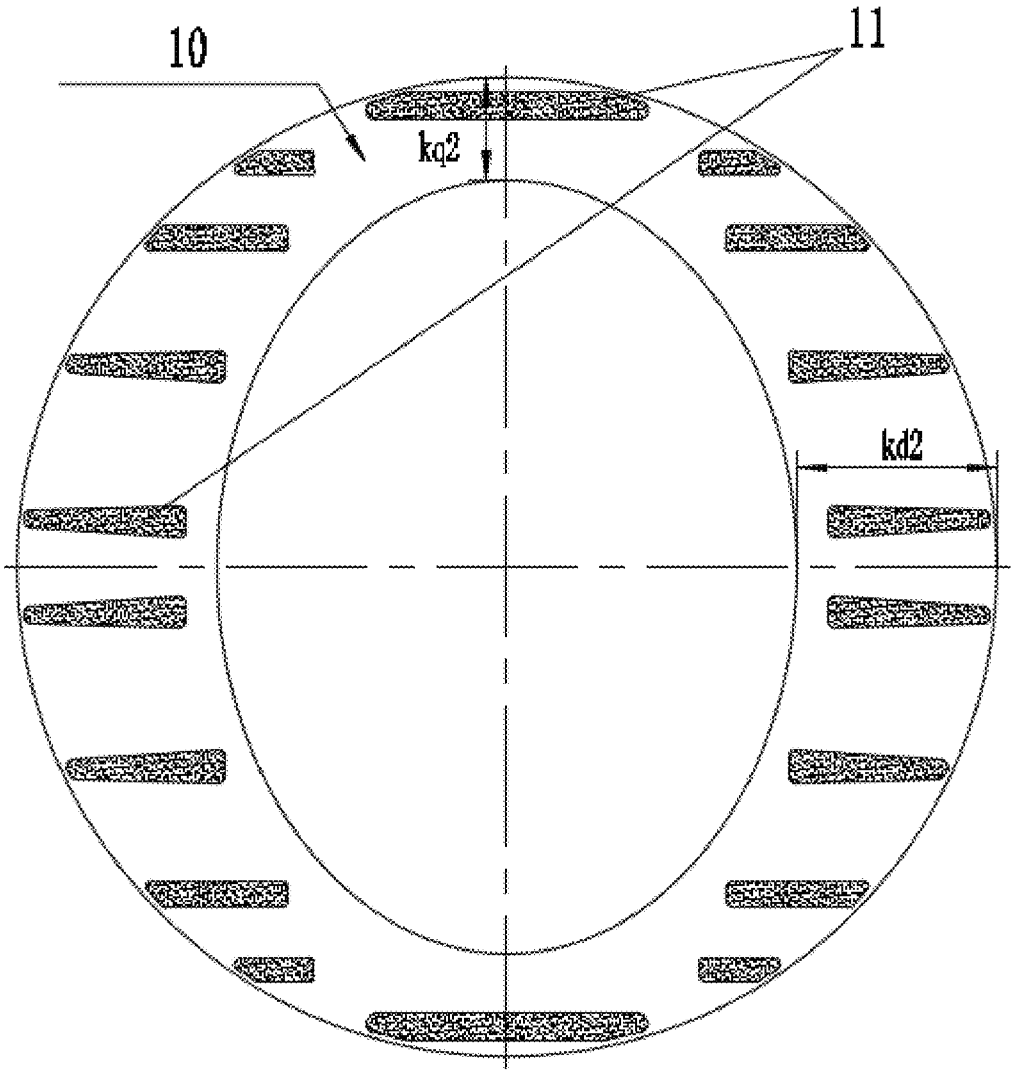
FIG. 2 is a schematic view showing an axial structure of a second rotor lamination of the motor rotor according to an embodiment of the present invention.
Figure 3:
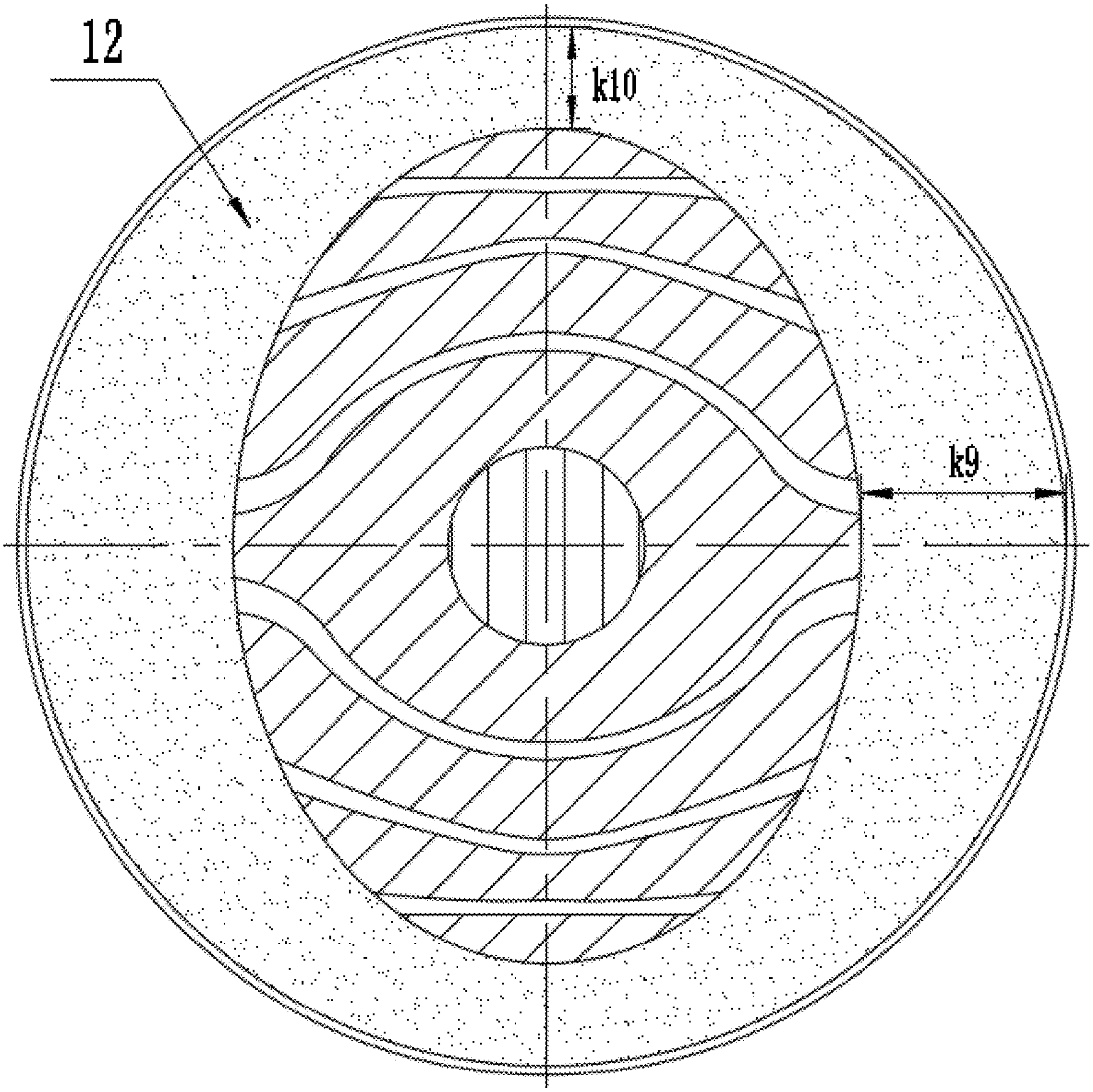
FIG. 3 is a schematic view showing an axial structure of the motor rotor according to an embodiment of the present invention.

1. first rotor lamination; 2. rotor slot; 31. first filling slot; 32. second filling slot; 4. shaft hole; 5. separating rib; 10. second rotor lamination; 11. through slot; 12. end ring.

DETAILED DESCRIPTION OF THE EMBODIMENTS

Referring to FIGS. 1 to 10, an embodiment of the present invention provides a motor rotor including a rotor core. The rotor core includes a first rotor lamination 1, and filling slots and rotor slots 2 are formed in the first rotor lamination 1. The filling slots include second filling slots 32 and first filling slots 31. Multiple magnetic barrier layers are arranged on the first rotor lamination 1 at intervals along a q-axis. The multiple magnetic barrier layers include two outer magnetic barrier layers and multiple inner magnetic barrier layers arranged between the two outer magnetic barrier layers. Each outer magnetic barrier layer includes one first filling slot 31, each inner magnetic barrier layer includes one rotor slot 2 and two second filling slots 32 arranged at two ends of the rotor slot 2 respectively. In the same inner magnetic barrier layer, separating ribs 5 each are arranged between the rotor slot 2 and each of the second filling slots 32. An axial plane, where a side of each separating rib 5 adjacent to a rotor outer circle is located, has a center point. L denotes a d-axial distance between two center points corresponding to two separating ribs 5 in any two adjacent magnetic barrier layers, and W denotes the maximum q-axial dimension of a magnetic channel formed between the filling slots in the two adjacent magnetic barrier layers, then L should satisfy $0 \le L < 2W$. In an embodiment, $0 \le L < W$. In some embodiments, $0 \le L \le 0.8W$. In this technical solution, the minimum distance between the filling slots of the rotor is limited, such that on the one hand, the saturation of the magnetic channel between the filling slots is reduced, and on the other hand, the relative positions of the magnetic channel and the stator teeth are staggered, which has beneficial effects of reducing motor harmonics, reducing torque ripples, reducing harmonic losses, and improving efficiency and operational stability of the motor. FIGS. 6 to 9 show comparisons of the effects of the technology of the present invention and the existing technology. It can be seen from FIG. 6 that, compared with that of the existing technology, the current waveform of the technology of the present invention is closer to a sine wave. It can be obtained from FIG. 7 that the torque ripple of the motor using the technical solution of the present invention is greatly reduced. It can be seen from FIG. 8 that the content of current harmonics caused by the technology of the present invention is greatly reduced. It can be seen from FIG. 9 that, the efficiencies of the motor using the technology of the present invention at different torque points are improved.

It should be noted that, the aforementioned center point is the geometric center point of the axial plane, where the side of the separating rib 5 adjacent to the rotor outer circle is located. As a specific embodiment, as shown in FIG. 1, the aforementioned plane is a rectangular plane extending along the rotation-axial direction of the first rotor lamination 1. The geometric center point of the rectangular plane is also the intersection of the diagonals of the rectangular plane. The intersection is projected along the rotation-axial direction of the first rotor lamination 1 to obtain a point, namely the midpoint of the side of the separating rib 5 adjacent to the rotor outer circle.

In some embodiments, after the rotor core is assembled with the corresponding stator core, a width of the air gap formed between the rotor core and the stator core is σ, $0 \le L < 8\sigma$. In some embodiments, $0 \le L \le 6\sigma$. In these arrangements, the separating rib 5 may enhance the mechanical strength of the rotor, reduce the deformation of the rotor during a manufacture, reduce the process difficulty. The relative distance between the separating ribs each formed between the rotor slot and a filling slot of the rotor is limited, which may increase a pressure-bearing area between two adjacent magnetic barrier layers, thereby forming an effect of supporting mutually, reducing the deformation of the rotor during the manufacture, and reducing the process difficulty.

In some embodiments, L1 denotes a d-axial width of the separating rib 5 in the inner magnetic barrier layer adjacent to the first filling slot 31. The first rotor lamination has a shaft hole 4, and L2 denotes a d-axial width of the separating rib 5 in the inner magnetic barrier layer adjacent to the shaft hole 4, and L1 is not less than L2, and $L1 \ge 0.5\sigma$. The minimum width of the separating rib 5 is limited, such that the process difficulty may be reduced and the mechanical strength of the rotor is improved. $L1 \ge L2$, which may reduce the magnetic flux leakage of the inner magnetic barrier layer and improve the efficiency of the motor.

In some embodiments, the sides/side of the separating rib 5 corresponding to the adjacent second filling slot 32 and/or the rotor slot 2 are parallel to or intersect with the q-axis, that is, the shape of the separating rib 5 is not limited to a rectangle, a trapezoid, or an arc, and may be flexibly designed according to the directions of the magnetic flux leakage lines, thus reducing the magnetic flux leakage of the motor.

In some embodiments, the axial plane, where a side of the separating rib 5 adjacent to the rotor outer circle is located, has one center point. k7 denotes a d-axial distance between two center points corresponding to the separating ribs 5 in the outermost inner magnetic barrier layer adjacent to the rotor outer circle and in the adjacent inner magnetic barrier layer thereof, respectively, and k8 denotes a d-axial distance between two center points corresponding to the separating ribs 5 in the outermost inner magnetic barrier layer adjacent to the rotor outer circle and in the innermost magnetic barrier layer adjacent to the shaft hole 4 of the rotor, respectively, then $0 \le k7/k8 \le 0.6$. In an embodiment, $0 \le k7/k8 \le 0.4$. In an embodiment, $0 \le k7/k8 \le 0.2$. In these arrangements, the filling slot in an outer layer may provide a support for the rotor slot 2 in an inner layer, thereby reducing the deformation of the rotor during the manufacture.

The d-axis and the q-axis divide the first rotor lamination 1 into four quadrants based on the center of the shaft hole 4. In the first quadrant, for example, in the upper right region of the first rotor lamination 1 shown in FIG. 4, kd1 denotes the minimum distance from the geometric center of the separating rib 5 to the d-axis, and kq1 denotes the minimum distance from the geometric center of the separating rib 5 to the q-axis, it is satisfied that $kq1 = -v \times kd1 + \lambda$, where $0.28 \le v \le 0.46$, v is dimensionless, $28 \le \lambda \le 33$, and the dimension of λ is consistent with those of kq1 and kd1, such that the position and the width of the separating rib are limited, thereby further reducing the risk of a deformation of the rotor.

In some embodiments, the filling slots are located at an outer circumference of the rotor, L3 denotes an interval between the second filling slot 32 of the innermost magnetic barrier layer adjacent to the shaft hole and the rotor outer circle, L4 denotes an interval between the first filling slot 31 of the outer magnetic barrier layer adjacent to the rotor outer circle and the rotor outer circle, then $L4 \ge L3$ and $0 \le L3 \le 2.5\sigma$ are satisfied. $0 \le L3 \le 2.5\sigma$, that is, the filling slot is an open slot or a closed slot. When the filling slot is a closed slot, the maximum interval between the filling slot and the rotor outer circle is limited, such that magnetic flux leakage is reduced. $L4 \ge L3$, which may reduce the magnetic flux leakage of the inner magnetic barrier layer while ensuring the mechanical strength of the outer magnetic barrier layer.

In some embodiments, the maximum q-axial width of an end portion of each filling slot adjacent to the rotor outer circle is not greater than the maximum q-axial width of a region of the filling slot adjacent to the q-axis of the rotor. In some embodiments, the q-axial widths of each filling slot from the rotor outer circle to the q-axis of the rotor are approximately equal, and a width deviation is not greater than 5%, such that the width, adjacent to the air gap, of the magnetic channel between the magnetic barrier layers of the rotor is ensured, thus reducing the saturation of the rotor. The q-axial widths of the filling slot are approximately equal (i.e., a deviation is not greater than 5%), which may increase the area of the filling slot while ensuring the width of the magnetic channel adjacent to the air gap, thus achieving beneficial effects of improving starting.

A ratio of the maximum q-axial width to the minimum q-axial width of the filling slot is $\tau$, and $1 \leq \tau \leq 2$. In some embodiments, $1.3 \leq \tau \leq 1.5$. By limiting the ratio, on the one hand, the width of the magnetic channel will not be too small due to an excessive q-axial width of the filling slot to affect the efficiency, and on the other hand, the area of the filling slot will not be too small due to a too small q-axial width of the filling slot to affect the starting.

In some embodiments, the maximum d-axial widths of the second filling slots 32 of the inner magnetic barrier layers gradually increase along the q-axis direction from the rotor outer circle to the center of the shaft hole 4. In some embodiments, the maximum d-axial widths of the second filling slots 32 of at least three layers continuously increase along the q-axis direction from the rotor outer circle to the center of the shaft hole 4. In some embodiments, the maximum d-axial widths of the second filling slots 32, which are in magnetic barrier layers from the second inner magnetic barrier layer adjacent to the d-axis to the inner magnetic barrier layer adjacent to the rotor outer circle, continuously decrease along the q-axis from the center of the shaft hole 4 to the rotor outer circle. Such arrangements may ensure amount of cast aluminum with an appropriate area while making reasonable use of a rotor space, thereby improving the starting capability of the motor.

In some embodiments, each rotor slot 2 includes a curved segment and/or a straight segment, and curvature radii of the curved segments of the rotor slots 2 become larger gradually in the direction from the center of the shaft hole to the rotor outer circle. In the same layer, the curvature radius of an outer arc of the rotor slot is greater than the curvature radius of an inner arc of the rotor slot, and the curved segment protrudes in the direction from the shaft hole towards the rotor outer circle. Or, two ends of a rotor slot 2 extend toward the rotor outer circle in a direction parallel to the d-axis to form straight segments respectively. Two ends of each of or part of the rotor slots 2 are parallel to the d-axis, and the q-axial widths of each rotor slot 2 gradually increase from the middle of the rotor slot 2 toward two ends thereof. The shaft hole 4 is formed in the middle of the rotor. Such arrangements may increase the space utilization of the rotor and allow the rotor slots to be rationally arranged, thus increasing a salient pole ratio of the rotor and improving the reluctance torque of the motor.

In the direction from the center of the shaft hole 4 to the rotor outer circle along the q-axis, the q-axial widths of the rotor slots 2 of at least three layers decrease continuously, and the q-axial width of a rotor slot 2 is m2, the q-axial width of the first filling slot 31 is m1, the sum of the q-axial widths of all rotor slots 2 and the first filling slot 31 is $(m1+\Sigma m2)$. A width from the hole wall of the shaft hole 4 to the outer circle of the first rotor lamination is m3, it is satisfied that $(m1+\Sigma m2)/m3=0.2$ to 0.5. Preferably, $(m1+\Sigma m2)/m3=0.3$ to 0.4. A reasonable proportion of the magnetic barrier layers is selected, which not only ensures a sufficient magnetic barrier width, but also ensures a reasonable magnetic flux channel, thus preventing oversaturation of the magnetic channel while increasing the salient pole ratio of the motor.

In some embodiments, from the shaft hole to the rotor outer circle, lengths of curves each between ends of each rotor slot 2 adjacent to two second filling slots 32 in each layer decrease gradually, and the lengths of the curves in adjacent rotor slots 2 decrease by a ratio from 5% to 25%. The purpose of such an arrangement is to ensure a certain proportion of magnetic barrier layers and improve the motor performance while rationally utilizing space of the rotor.

In some embodiments, the separating rib 5 has the d-axial width L2, $L2 \geq 0.5\sigma$, where $\sigma$ denotes the width of the air gap formed between the rotor core and the stator core, such that the mechanical strength of the structure of the rotor may be ensured.

In some embodiments, among the filling slots (i.e., the first filling slots 31 and the second filling slots 32) formed in the first rotor lamination 1, at least five filling slots have different filling areas. And/or, the total filling area of the first filling slots 31 and the second filling slots 32 accounts for 30% to 70%, preferably 35% to 50%, of the total cross-sectional area of the first filling slots 31, the second filling slots 32 and the rotor slots 2, such that a certain proportion of the filling slot area is ensured, and that the motor has a certain capability of starting with load.

The minimum width of the magnetic channel between two adjacent filling slots each in two adjacent magnetic barrier layers respectively is W1, and $W1 \geq d$, where d denotes the minimum width of the magnetic channel between two rotor slots each in the two adjacent magnetic barrier layers respectively. In some implementations, $W1/d > 1.15$, to ensure a sufficient width between the filling slots, thus avoiding a magnetic field saturation which may affect the magnetic flux in the magnetic channel between the magnetic barrier layers.

The minimum q-axial dimension of the magnetic channel between two adjacent rotor slots 2 each in two adjacent magnetic barrier layers respectively is h1, and $h1 \geq 1.5h2$, where h2 denotes the minimum q-axial width of one magnetic barrier layer, whose rotor slot 2, among the rotor slots each in the two adjacent magnetic barrier layers respectively, has a smaller q-axial width. Such an arrangement may reduce the process difficulty of the rotor, and ensure the uniformity and unsaturation of the magnetic density distribution of the rotor.

In some embodiments, the d-axial width of each first filling slot 31 is less than a d-axial width between ends of the two second filling slots 32 in the adjacent magnetic barrier layer, where the ends of the two second filling slots 32 are those adjacent to the rotor slot 2 respectively. The purpose of such an arrangement is to limit the d-axial width of the first filling slot 31, thereby avoiding a deformation of the rotor toward the shaft hole or toward the outer circle due to an excessive width.

In some embodiments, the ratio of a q-axial distance L5 between the inner wall of a first filling slot 31 and the rotor center to the radius Rr of the rotor satisfies $0.82 \leq L5/Rr \leq 0.96$. If L5/Rr is too small, then the outermost magnetic channel is too narrow, the loss of the motor increases, and the efficiency the motor decreases. If L5/Rr is too large, then the distance between the first filling slot 31 and the rotor outer circle is too small, making processing more difficult. A ratio of the q-axial distance between respective sides of the two innermost magnetic barrier layers adjacent to the shaft hole, to a q-axial width of the rotation shaft is greater than 1.2, which, on the one hand, may ensure the width of the magnetic channel between the innermost magnetic barrier layer and the rotation shaft, and reduce the magnetic density saturation of the rotor, and on the other hand, may enhance the mechanical strength of the portion of the rotor adjacent to the rotation shaft. And/Or, a ratio of the diameter of the curved segment of the side of the innermost magnetic barrier layer adjacent to the shaft hole to the q-axial width of the rotation shaft is greater than 2, so as to reasonably utilize the space of the rotor for the arrangement of the magnetic barrier layer.

In some embodiments, the maximum q-axial thickness of the first filling slot 31 is k, and the maximum q-axial thickness of the second filling slot 32 in the adjacent magnetic barrier layer of the first filling slot is k1, and the minimum q-axial thickness of the magnetic channel connected to the first filling slot is k2, then $1<k/k1\leq 2$, and/or, $0.8<k/k2\leq 1.6$, which not only ensures the q-axial thickness of the first filling slot 31, thus reducing the process difficulty, but also ensures the width of the outermost magnetic channel to improve the motor performance.

The magnetic channels each are formed between two adjacent magnetic barrier layers. In the direction from the center of the shaft hole 4 to the rotor outer circle along the q-axis, the q-axial widths of the magnetic channels decrease gradually. More preferably, in the direction from the center of the shaft hole 4 to the rotor outer circle along the q-axis, the q-axial widths of at least three layers of magnetic channels decrease continuously. The closer the magnetic channel is to the shaft hole 4, the greater the effect of the magnetic channel on the stator is, and the greater the impact on the motor performance is. Such an arrangement ensures the width of the magnetic channel adjacent to the shaft hole on the basis of rationally utilizing the space of the rotor, thereby having beneficial effects of improving the motor performance.

The magnetic channel is formed between two adjacent magnetic barrier layers. For the magnetic channel consisting of curved segments and straight segments, in directions from the q-axis to the two sides of the q-axis respectively, the widths of the magnetic channel (a width of the magnetic channel is defined as: a shortest distance from a point on one side of the magnetic channel to the other side thereof) gradually increase. The width of the magnetic channel defined herein is a width of a section which the magnetic flux lines of the rotor pass through. Such an arrangement has beneficial effects of reducing the magnetic density saturation of the rotor and reducing the loss of the motor.

In some embodiments, in each magnetic barrier layer, the ratio of a width of a portion of the rotor slot 2 located at a position where the q-axis is located, to the width of the end of the rotor slot 2 adjacent to a corresponding filling slot is $\tau 1$, and from the innermost inner magnetic barrier layer to the outermost inner magnetic barrier layer, the ratios $\tau 1$ gradually increase, which not only ensures the width of each of the magnetic channels between the inner magnetic barrier layers, but also ensures a certain proportion of the magnetic barrier layers, thereby improving the motor performance.

In some embodiments, in each inner magnetic barrier layer, a ratio of the maximum q-axial width of each filling slot to the q-axial width of the rotor slot 2 is $\tau 2$, and $\tau 2>1.4$. In some embodiments, $1.5<\tau 2<3.0$. The ratio is limited, such that the filling slots each are ensured to have a certain width to increase an arrangement area thereof. A range of the ratio is limited, which may also ensure the widths of the magnetic channels between the filling slots.

k3 denotes a d-axial width between ends of the two second filling slots 32, which are located at and adjacent to two ends of the rotor slot 2 in the sub-outer inner magnetic barrier layer adjacent to the rotor outer circle respectively. K4 denotes a d-axial width between ends of the two second filling slots 32, which are located at and adjacent to two ends of the rotor slot 2 in the adjacent inner magnetic barrier layer thereof adjacent to the shaft hole respectively. It is satisfied that $0.5\leq k3/k4\leq 1$ or $0.5\leq k4/k3\leq 1$. When the space of the rotor is limited, such an arrangement may increase the area of the filling slots and improve the starting capability of the motor. k5 denotes a d-axial width between ends of the two second filling slots 32, which are located at and adjacent to two ends of a rotor slot 2 in an outmost layer adjacent to the rotor outer circle respectively. k6 denotes a d-axial width between ends of the two second filling slots 32, which are located at and adjacent to two ends of a rotor slot 2 in an innermost layer adjacent to the shaft hole respectively. $0.5\leq k5/k6\leq 1$ or $0.5\leq k6/k5\leq 1$ is satisfied. When the space of rotor is limited, such an arrangement may increase the area of the filling slots and improve the starting capability of the motor.

In some embodiments, the angle formed between straight lines connecting the center of the rotor and two ends of the first filling slot 31 respectively is $\alpha 1$, $20°\leq\alpha 1\leq 60°$. In some embodiments, $30°\leq\alpha 1\leq 50°$. In some embodiments, $30°\leq\alpha 1\leq 35°$. In such arrangements, the magnetic barrier layers are formed and used as the filling slots. As the magnetic barrier layers, they may increase the reluctance torque of the motor, and may also be used as a starting squirrel-cage to improve the starting performance of the motor.

The number of the first filling slots 31 is n, and $n\geq 1$. The first filling slot 31 is not limited to be arranged as a whole block, or as divided blocks, and the number of blocks is not limited, and may be flexibly selected according to acquirements for the strength of the rotor and for the amount of the magnetic leakage of the rotor. If the rotor flux leakage is required to be small, the value of n is small. If the rotor strength is required to be high, the value of n is large. And/Or, a parallelism deviation between the length extension direction of the filling slot and the d-axis does not exceed 5%, so that the d-axial magnetic lines of the rotor flow smoothly, and that the q-axial magnetic lines are reduced as many as possible, thereby increasing the salient pole difference of the motor, and improving the output and efficiency of the motor.

In some embodiments, the maximum q-axial width of the shaft hole 4 in the first rotor lamination is not greater than the maximum d-axial width thereof. The rotor slots 2 are arranged in the q-axis direction. Such an arrangement may increase the space utilization of the rotor, so that the rotor slots 2 may be reasonably arranged to increase the salient pole ratio of the rotor and improve the reluctance torque of the motor.

The shaft hole 4 is composed of curved segments and/or straight segments. The shape of the shaft hole may be but is not limited to a circle, an ellipse, an elliptical shape, or a quadrilateral, and may be flexibly configured according to the arrangement of the rotor slots.

In some embodiments, the rotor core further includes a second rotor lamination 10. The second rotor lamination 10 is arranged between an end ring 12 and the first rotor lamination 1. Through slots 11 (whose function is the same as that of the filling slots) are formed in the second rotor lamination 10 at positions corresponding to the filling slots respectively.

In some embodiments, the maximum width of the outer contour of the second rotor lamination 10 is not greater than the diameter of the outer circle of the first rotor lamination 1, and the maximum q-axial width of the inner hole of the second rotor lamination 10 is not less than the maximum d-axial width thereof. Preferably, the ratio of the maximum q-axial width of the inner hole of the second rotor lamination 10 to the maximum d-axial width thereof is in a range from 1 to 1.5. As a part of the rotor, the second rotor lamination 10 has the outer contour not greater than the outer circle of the first rotor lamination 1, so that an air gap with a certain width is formed between the second rotor lamination and the stator. The inner contour of the second rotor lamination 10 corresponds the rotor slots of the first rotor lamination in the q-axis direction, and the q-axial width of the inner contour of the second rotor lamination 10 needs to be not less than the d-axial width thereof, so that the rotor slots with a sufficient area are in a direct contact with air, to form circulation slots and increase the heat dissipation of the rotor.

The rotation-axial thickness of the second rotor lamination 10 is not less than the thickness of a single-piece first rotor lamination 1 to ensure the mechanical strength of the rotor.

In some embodiments, among the radial widths each between the inner hole of the second rotor lamination 10 and the outer circle thereof, the q-axial radial width is the smallest, and the d-axial radial width kd2 of the second rotor lamination 10 and the q-axial radial width kq2 of the second rotor lamination 10 satisfy $1.1 \le kd2/kq2 \le 2.8$. Preferably, $1.2 \le kd2/kq2 \le 1.8$. Thus it is ensured that enough rotor slots 2 in the first rotor lamination 1 are located within the inner hole of the second rotor lamination 10.

In some embodiments, the total cross-sectional area of the through slots 11 in the second rotor lamination 10 is less than or equal to the total cross-sectional area of the filling slots in the first rotor lamination 1. The through slots 11 in the second rotor lamination 10 are entrances for filling materials into the filling slots in the first rotor lamination 1. The through slots are formed in the second rotor lamination 10, such that the filling materials may enter the filling slots in the first rotor lamination 1. The total cross-sectional area of the through slots 11 in the second rotor lamination 10 is ensured not to be greater than the total cross-sectional area of the filling slots in the first rotor lamination 1, such that a stress-bearing area of the non-filling-slot portion of the first rotor lamination may be reduced in the process of filling materials, thus ensuring the mechanical strength thereof and reducing the amount of deformation in a process of filling the materials.

The through slots 11 formed in the second rotor lamination 10 are disposed at the corresponding positions of the filling slots formed in the first rotor lamination 1. A cross-sectional area of a single through slot 11 in the second rotor lamination 10 is not larger than a cross-sectional area of a single filling slot at the corresponding position in the first rotor lamination 1, thus reducing a local deformation of the first rotor lamination in the process of filling the materials.

In some embodiments, a d-axial width between the inner hole of the second rotor lamination 10 and each through slot 11 is greater than a d-axial width of a corresponding separating rib 5 between the through slot 11 and a corresponding rotor slot 2, thus ensuring that the rotor slot 2 is not filled with material during the manufacture of the rotor.

In some embodiments, the total cross-sectional area of the rotor slots 2 of the first rotor lamination 1, which are within an inner circumference of the inner hole of the second rotor lamination 10, accounts for at least 20% of the total circulation area of circulation slots of the motor. In some embodiments, the total cross-sectional area of the rotor slots 2 of the first rotor lamination 1, which are within the inner circumference of the inner hole of the second rotor lamination 10, accounts for 25% to 40% of the total circulation area of the circulation slots of the motor; and/or, the total cross-sectional area of the rotor slots 2 of the first rotor lamination 1, which are within the inner hole of the second rotor lamination 10, accounts for at least 30% of the total cross-sectional area of the rotor slots 2. In some embodiments, the total cross-sectional area of the rotor slots 2 of the first rotor lamination 1, which are within the inner hole of the second rotor lamination 10, accounts for 45% to 65% of the total cross-sectional area of the rotor slots 2, so that the rotor slots with a sufficient area are in a direct contact with air, to form circulation slots and increase the heat dissipation of the rotor. It should be noted that the total circulation area of the circulation slots of the motor includes a total circulation area of the circulation slots of the stator core of the motor and the total cross-sectional area of the rotor slots 2 uncovered by the second rotor lamination 10 (that is, the total cross-sectional area of the rotor slots 2 within the inner hole of the second rotor lamination 10).

In some embodiments, along the direction from the center of the shaft hole of the rotor to the rotor outer circle, the cross-sectional areas of the rotor slots 2 in the magnetic barrier layers on the first rotor lamination 1, which are disposed within the inner circumference of the inner hole of the second rotor lamination 10, gradually decrease. In this case, a portion of the correspondingly formed end ring 12, which is located at the magnetic barrier layer adjacent to the rotor outer circle, has a q-axial thickness, thereby ensuring that the end ring 12 has a certain volume to improve the starting capability of the motor.

In some embodiments, the maximum width of the outer contour of the end ring 12 is not greater than the maximum width of the outer contour of the second rotor lamination 10, and the maximum distance from the center of the shaft hole of the rotor to an end face of the end ring 12 is not less than the maximum distance from the center of the shaft hole of the rotor to an end face of the second rotor lamination 10, and the maximum width of the outer contour of the end ring 12 is not greater than the maximum width of the outer contour of the second rotor lamination 10, such that it is ensured that a force exerted on a portion of the first rotor lamination, which is disposed at the rotor outer circle and not covered by the second rotor lamination 10, may reduce a local deformation. The maximum distance from the center of the shaft hole 4 of the rotor to the end face of end ring 12 is not less than the maximum distance from the center of the shaft hole 4 of the rotor to the end face of the second rotor lamination 10, thereby ensuring that the rotor has the end ring with a certain volume and improving the starting capability of the motor.

The d-axial radial width between the inner hole and the outer circle of the end ring 12 is k9, and the q-axial radial width therebetween is k10, then it is satisfied that $1.1 \le k9/k10 \le 2.8$. In some embodiments, $1.2 \le k9/k10 \le 1.8$. The filling slot of the inner layer adjacent to the shaft hole has a relatively large d-axial width, and in order to cause the filling slot to short itself, the d-axial radial width of the end ring is relatively large. In order to ensure the rotor slots to be in a direct contact with the air, the d-axial radial width of the end ring cannot be too large. A balancing block is arranged on the end ring 12, and the balancing block is located on a side having a larger radial width between the inner hole and the outer circle of the end ring 12.

At least part of the filling slots are filled with conductive and non-magnetic material, and are shorted by the end rings 12 arranged at two ends of the second rotor lamination 1 respectively to form a squirrel-cage. The material of the end ring 12 is the same as the filling material in the filling slots. The self-shorted squirrel-cage structure provides an asynchronous torque at the starting stage, thereby achieving the self-starting of the motor, eliminating controller consumption, and improving the efficiency of the motor. The structure of multiple magnetic barrier layers provides the magnetic resistance torque for the motor to achieve a synchronous operation of the motor.

Figure 4:
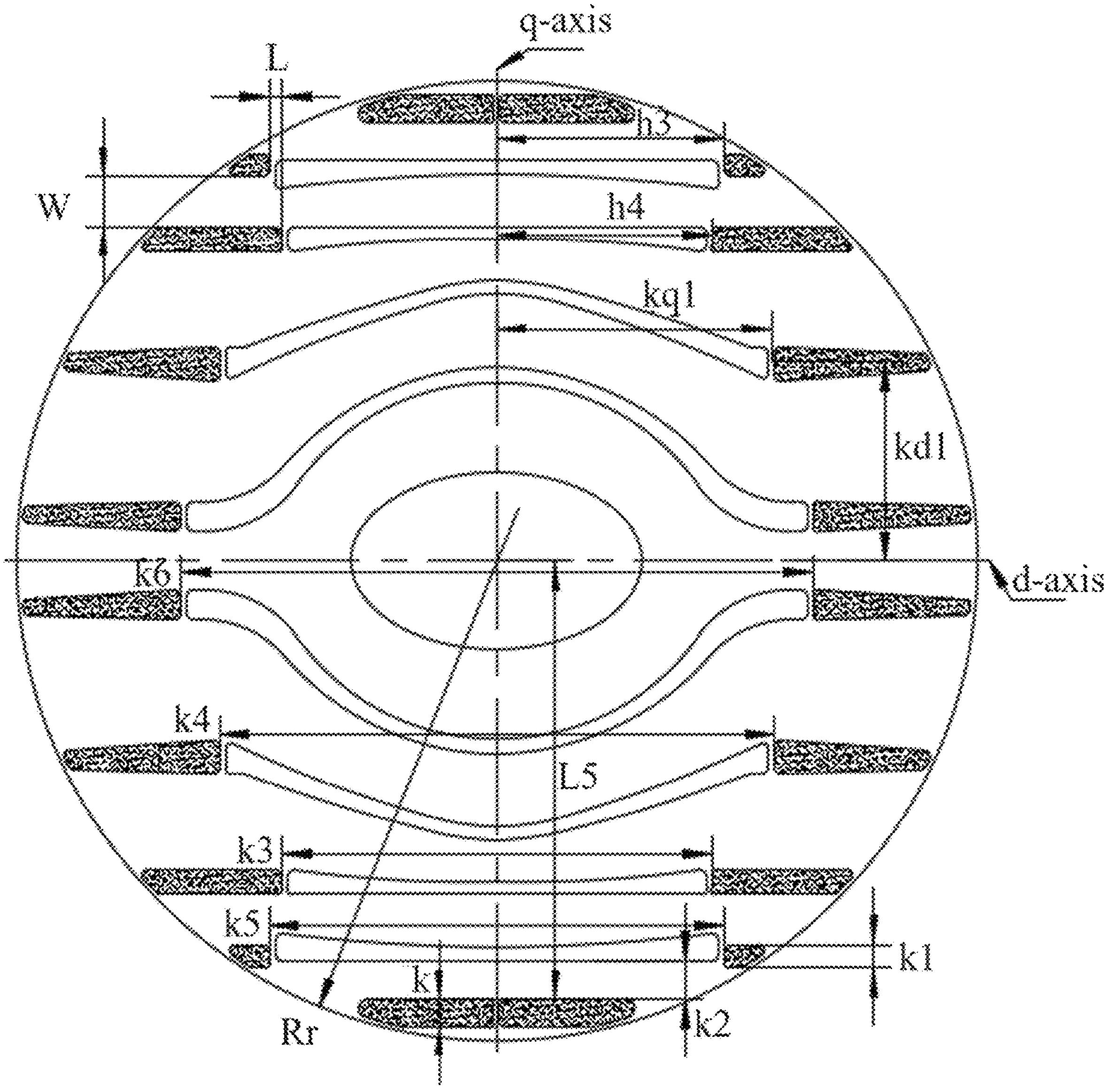
FIG. 4 is a schematic view showing an axial structure of the first rotor lamination of the motor rotor according to another embodiment of the present invention.

It should be noted that the distances from the q-axis to the respective sides of the separating ribs 5 adjacent to the rotor outer circle in two adjacent inner magnetic barrier layers are not equal, that is, the distance from the q-axis to the side of the separating rib of an inner magnetic barrier layer adjacent to the rotor outer circle among two adjacent inner magnetic barrier layers is greater than or less than the distance from the q-axis to the side of the separating rib 5 of an inner magnetic barrier layer adjacent to the shaft hole of the rotor among the two adjacent inner magnetic barrier layers. As shown in FIG. 4, $h3 \neq h4$. In some embodiments, $h3 > h4$, while in FIG. 1, $h3 < h4$.

Figure 5:
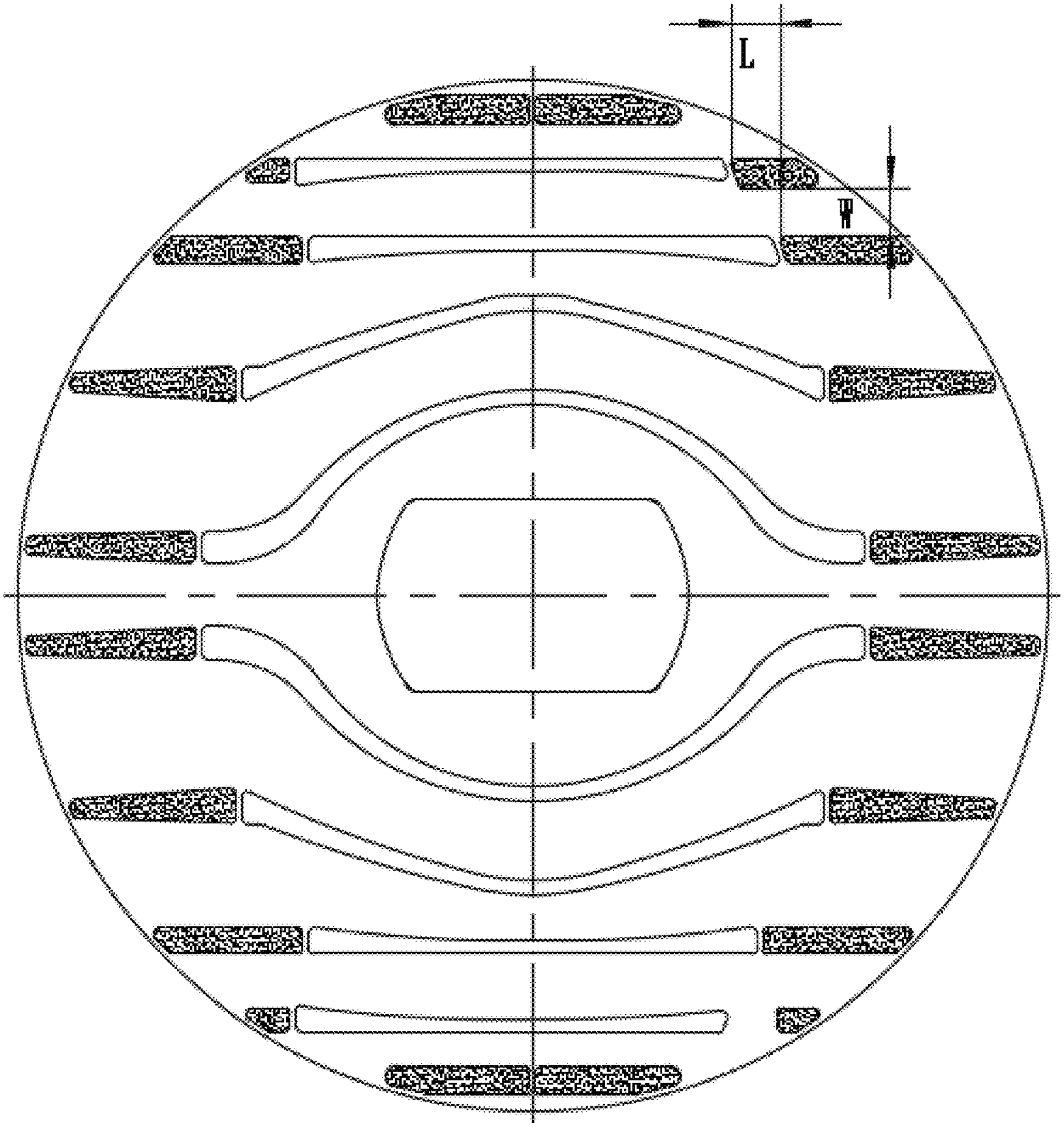
FIG. 5 is a schematic view showing an axial structure of the first rotor lamination of the motor rotor according to yet another embodiment of the present invention.
Figure 6:
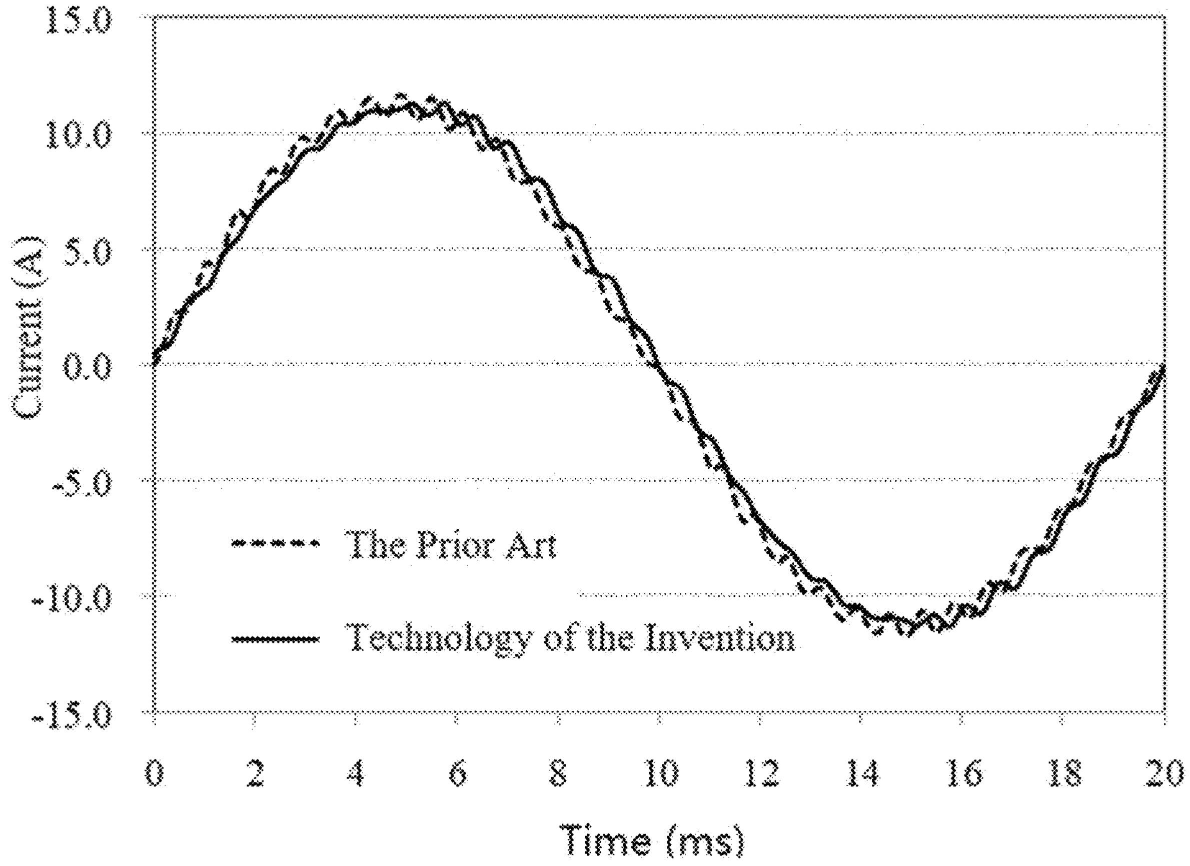
FIG. 6 shows a comparison between a current waveform of the motor using technical solutions of the present invention and a current waveform of a motor in the prior art.
Figure 7:
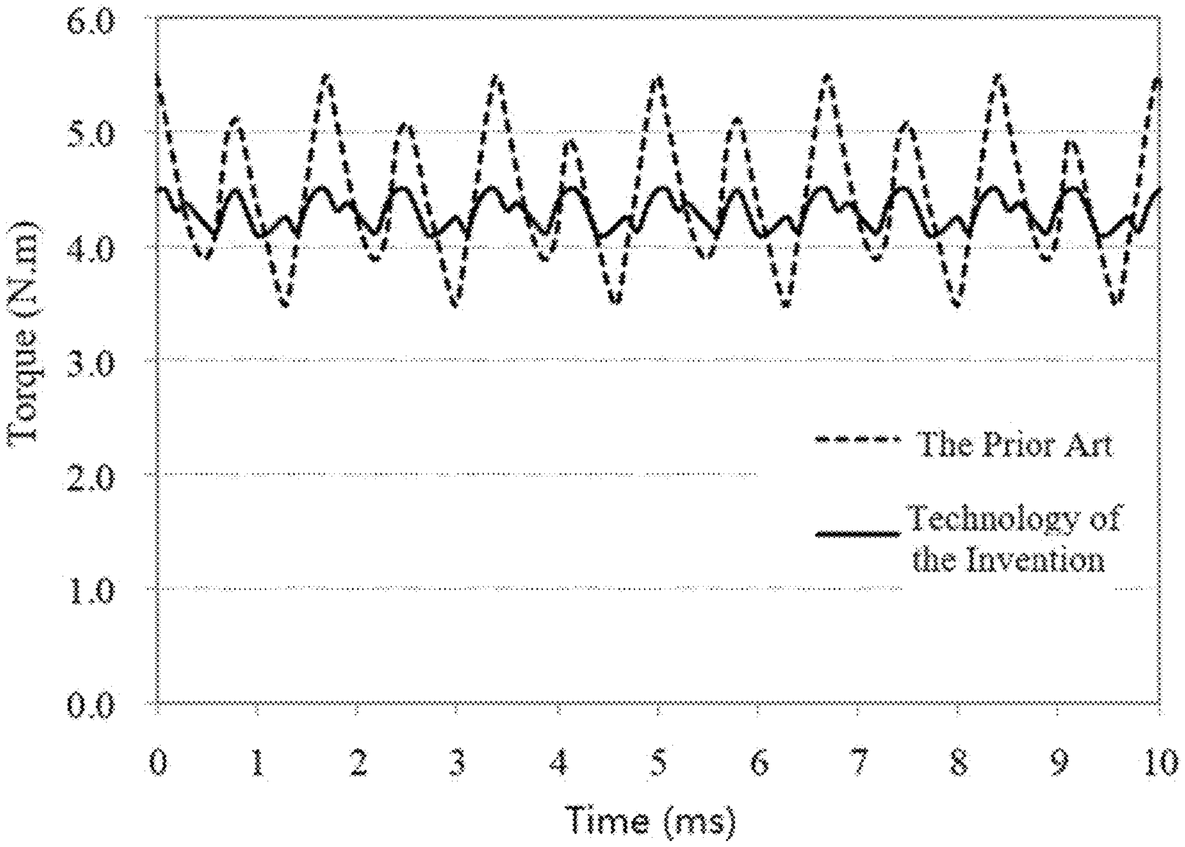
FIG. 7 shows a comparison between a torque ripple of the motor using technical solutions of the present invention and a torque ripple of the motor in the prior art.
Figure 8:
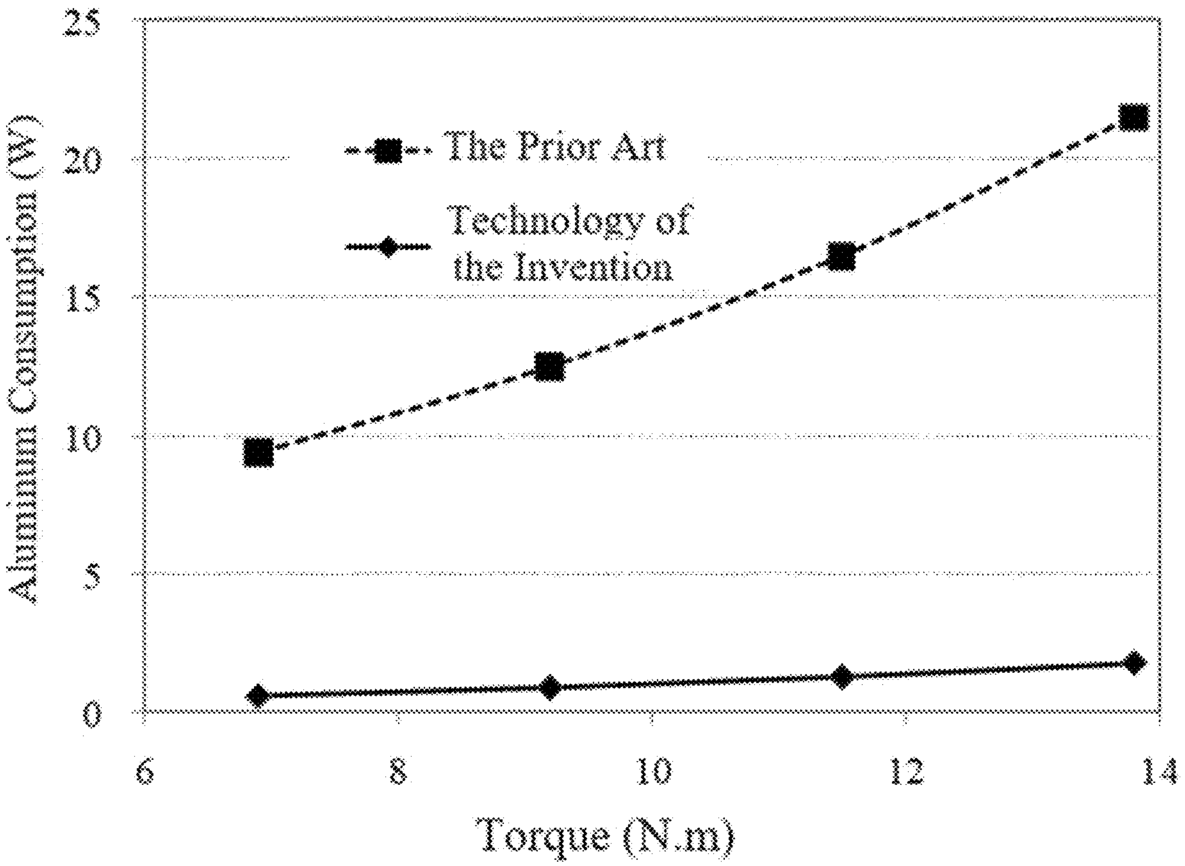
FIG. 8 shows a comparison between a harmonic loss of the motor using technical solutions of the present invention and a harmonic loss of the motor in the prior art.
Figure 9:
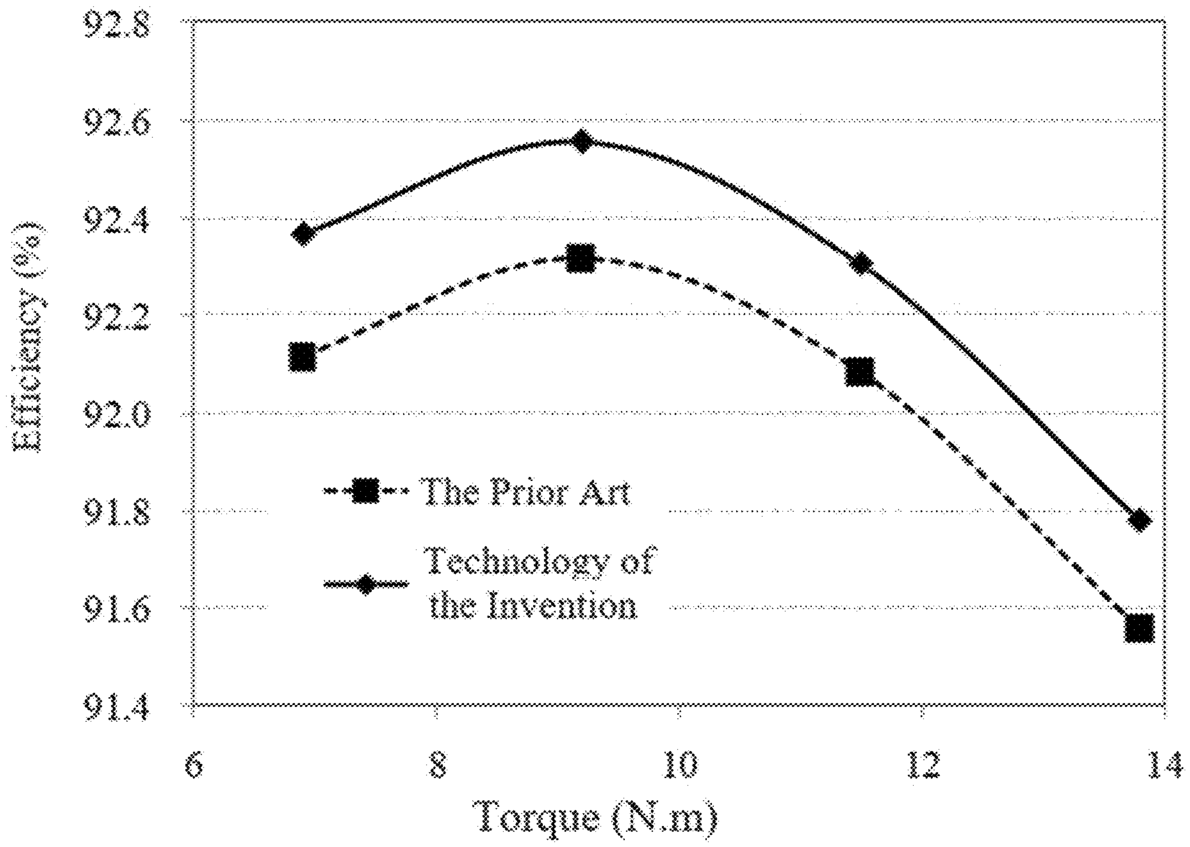
FIG. 9 shows a comparison between an efficiency of the motor using technical solutions of the present invention and an efficiency of the motor in the prior art.
Figure 10:
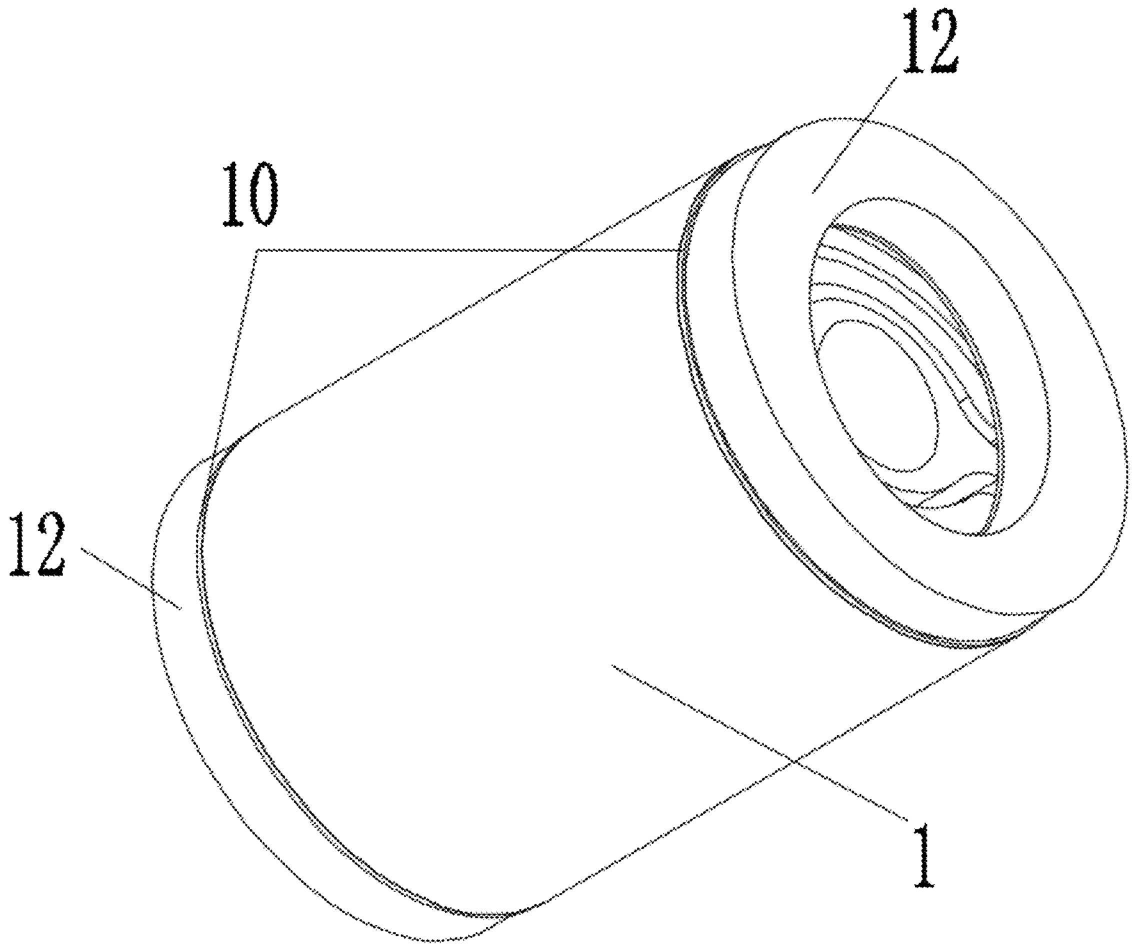
FIG. 10 is a schematic three-dimensional structural view showing the motor rotor according to an embodiment of the present invention.

The plane, where a side surface of the separating rib 5 is located, is parallel to or intersects with the plane where q-axes are located, that is, the shape of the separating rib is not limited to a rectangle, a trapezoid, or an arc. In some embodiments, as shown in FIG. 5, the planes where the side surfaces of part of separating ribs 5 are located intersect with the plane where the q-axes are located, while FIG. 1 shows a parallel arrangement.

The motor rotor structure provided by the present invention may reduce the saturation of the magnetic channel between the filling slots by limiting the minimum distance between the filling slots of the rotor, and may stagger the relative positions of the magnetic channels and the stator teeth, which has beneficial effects of reducing the motor harmonics, reducing the torque ripples, reducing the harmonic losses, and improving the motor efficiency and the operational stability. What's more, through limiting the relative distance between the separating ribs each arranged between a rotor slot and a corresponding filling slot of the rotor, the rotor may increase the pressure-bearing area between two adjacent magnetic barrier layers and form an effect of supporting mutually, reducing the deformation of the rotor during the manufacture, and reducing the process difficulty.

It should be understood that the length, width, thickness, diameter, etc. of related structures of the rotor core in the present invention may preferably be measured in mm, and under reasonable circumstances, other suitable measurement units may also be adopted.

The present invention provides a motor rotor of a self-starting synchronous reluctance motor, which realizes a self-starting of the motor through the asynchronous torque provided by the rotor guide bar (a component formed by the filling slots after being filled), solves the problem that the synchronous reluctance motor needs to be driven by a frequency converter, reduces the loss of the motor and improves the efficiency of the motor. The motor rotor can reduce the harmonics of the motor, reduce the torque ripples, reduce the harmonic losses, improve the efficiency and operating stability of the motor, enhance the mechanical strength of the rotor, reduce the deformation of the rotor during the manufacture, and reduces the process difficulty.

According to an embodiment of the present invention, a self-starting synchronous reluctance motor is also provided, especially a self-starting synchronous reluctance two-pole motor, including the motor rotor above. The inertia of the load connected to the output end of the motor shaft is smaller than 60% of the inertia of the rotation shaft system of the motor.

According to an embodiment of the present invention, a compressor is also provided, and includes the self-starting synchronous reluctance motor above.

It should be understood for those skilled in the art that the above embodiments can be freely combined and superimposed if no conflicts occur.

What described above are only some embodiments of the present invention but not intended to limit the present invention. Any modifications, equivalent substitutions and improvements made within the spirit and principles of the present invention shall be included in the protection scope of the present invention. What described above are some embodiments of the present invention. It should be noted that, for the ordinary skilled in the art, various improvements and modifications may be made without departing from the technical principles of the present invention, and these improvements and modification should also be regarded as the protection scope of the present invention.

What is claimed is:

1. A motor rotor, comprising a rotor core, wherein:

the rotor core comprises a first rotor lamination; filling slots and rotor slots are formed in the first rotor lamination; the filling slots comprise second filling slots and first filling slots;

multiple magnetic barrier layers are arranged on the first rotor lamination at intervals along a q-axis;

the multiple magnetic barrier layers comprise two outer magnetic barrier layers and multiple inner magnetic barrier layers arranged between the two outer magnetic barrier layers;

each outer magnetic barrier layer comprises one first filling slot; each inner magnetic barrier layer comprises one rotor slot and two second filling slots arranged at two ends of the rotor slot, respectively;

in the same inner magnetic barrier layer, separating ribs each are arranged between the rotor slot and each of the second filling slots;

a section, which is taken in an axial direction and where a side of each separating rib adjacent to a rotor outer circle is located, has a center point; L denotes a distance between two center points corresponding to two separating ribs in any two adjacent magnetic barrier layers measured along a d-axis direction, and W denotes the maximum dimension of a magnetic channel formed between the filling slots in the two adjacent magnetic barrier layers measured along a q-axis direction, and it is satisfied that $0 \leq L < 2W$; and wherein at least one limitation selected from the group consisting of:

(i) a ratio of a distance L5 between an inner wall of a first filling slot and a rotor center measured along the q-axis direction to a radius Rr of the rotor satisfies $0.82 \leq L5/Rr < 0.96$;

(ii) a ratio of a distance between respective sides of two innermost magnetic barrier layers adjacent to a shaft hole measured along the q-axis direction to a width of a rotation shaft of the rotor measured along the q-axis direction is greater than 1.2; and (iii) a ratio of a diameter of a curved segment of a side of an innermost magnetic barrier layer adjacent to a shaft hole to a width of the rotation shaft measured along the q-axis direction is greater than 2, is satisfied.

2. The motor rotor according to claim 1, wherein: L1 denotes a width of a separating rib in an inner magnetic barrier layer adjacent to a corresponding first filling slot measured along the d-axis direction; the first rotor lamination has a shaft hole; L2 denotes a width of a separating rib in an inner magnetic barrier layer adjacent to the shaft hole measured along the d-axis direction; and L1 is not less than L2, and it is satisfied that L1>0.5 σ.

3. The motor rotor according to claim 1, wherein: k7 denotes a distance, measured along the d-axis direction, between two center points corresponding to separating ribs in the outermost inner magnetic barrier layer adjacent to the rotor outer circle and in an adjacent inner magnetic barrier layer thereof, respectively; k8 denotes a distance, measured along the d-axis direction, between two center points corresponding to separating ribs in the outermost inner magnetic barrier layer adjacent to the rotor outer circle and in the innermost magnetic barrier layer adjacent to a shaft hole of the rotor, respectively; and it is satisfied that 0≤k7/k8≤0.6.

4. The motor rotor according to claim 1, wherein:

the filling slots are located at an outer circumference of the rotor; L3 denotes an interval between each second filling slot of an innermost magnetic barrier layer adjacent to a shaft hole and the rotor outer circle; L4 denotes an interval between each first filling slot of each outer magnetic barrier layer adjacent to the rotor outer circle and the rotor outer circle, and L4-L3 and 0≤L3≤2.5σ are satisfied; and/or the maximum width of an end portion of each filling slot adjacent to the rotor outer circle measured along the q-axis direction is not greater than the maximum width of a region of the filling slot adjacent to the q-axis of the rotor measured along the q-axis direction.

5. The motor rotor according to claim 4, wherein:

a width deviation of a width of each filling slot from the rotor outer circle to the q-axis of the rotor measured along the q-axis direction is not greater than 5%; and/or a ratio of the maximum width measured along the q-axis direction to the minimum width of each filling slot measured along the q-axis direction is τ, and 1≤τ≤2.

6. The motor rotor according to claim 1, wherein, maximum widths of the second filling slots of the inner magnetic barrier layers measured along the d-axis direction gradually increase along the q-axis direction from the rotor outer circle to a center of a shaft hole.

7. The motor rotor according to claim 1, wherein:

each rotor slot comprises a curved segment and/or a straight segment; curvature radii of curved segments of the rotor slots become larger gradually in a direction from a shaft hole to the rotor outer circle; in the same layer, a curvature radius of an outer arc of each rotor slot is greater than a curvature radius of an inner arc of the rotor slot, and the curved segment protrudes in the direction from the shaft hole to the rotor outer circle; or two ends of a rotor slot extend toward the rotor outer circle in a direction parallel to a d-axis to form straight segments respectively; two ends of each of or part of the rotor slots are parallel to the d-axis, and q-axial widths of each rotor slot gradually increase from the middle of the rotor slot toward two ends thereof.

8. The motor rotor according to claim 1, wherein the minimum width of a magnetic channel between two adjacent filling slots each in two adjacent magnetic barrier layers respectively is W1, and W1≥d, wherein, d denotes the minimum width of the magnetic channel between two rotor slots each in the two adjacent magnetic barrier layers respectively.

9. The motor rotor according to claim 1, wherein magnetic channels each are formed between two adjacent magnetic barrier layers, and in a direction from a center of a shaft hole to the rotor outer circle along the q-axis, widths of the magnetic channels measured along the q-axis direction decrease gradually.

10. The motor rotor according to claim 1, wherein k3 denotes a width, measured along the d-axis direction, between ends of the two second filling slots, which are located at and adjacent to two ends of the rotor slot in an outer magnetic barrier layer adjacent to the rotor outer circle respectively; k4 denotes a width, measured along the d-axis direction, between ends of the two second filling slots, which are located at and adjacent to two ends of the rotor slot in an adjacent inner magnetic barrier layer thereof adjacent to a shaft hole respectively, and it is satisfied that 0.53≤k3/k4≤1 or 0.5≤k4/k3≤1.

11. The motor rotor according to claim 1, wherein k5 denotes a width, measured along the d-axis direction, between ends of the two second filling slots, which are located at and adjacent to two ends of a rotor slot in an outmost layer adjacent to the rotor outer circle respectively; k6 denotes a width, measured along the d-axis direction, between ends of the two second filling slots, which are located at and adjacent to two ends of a rotor slot in an innermost layer adjacent to the shaft hole respectively, and it is satisfied that 0.5≤k5/k6≤1 or 0.5≤k6/k5≤1.

12. The motor rotor according to claim 1, wherein:

an angle formed between straight lines connecting a center of the rotor and two ends of a first filling slot respectively is α1, and 20°≤α1≤60° is satisfied; and/or a parallelism deviation between a length extension direction of each filling slot and a d-axis does not exceed 5%.

13. The motor rotor according to claim 1, wherein the rotor core further comprises a second rotor lamination, and the second rotor lamination is arranged between an end ring and the first rotor lamination; and through slots are formed in the second rotor lamination at positions corresponding to the filling slots respectively.

14. The motor rotor according to claim 13, wherein a total cross-sectional area of the through slots in the second rotor lamination is less than or equal to a total cross-sectional area of the filling slots in the first rotor lamination.

15. The motor rotor according to claim 13, wherein, along a direction from a center of a shaft hole of the rotor to the rotor outer circle, cross-sectional areas of the rotor slots in the magnetic barrier layers on the first rotor lamination within an inner circumference of an inner hole of the second rotor lamination gradually decrease.

16. The motor rotor according to claim 13, wherein the maximum width of an outer contour of the end ring is not greater than the maximum width of an outer contour of the second rotor lamination, and the maximum distance from a center of a shaft hole of the rotor to an end face of the end ring is not less than the maximum distance from the center of the shaft hole of the rotor to an end face of the second rotor lamination; and/or a d-axial radial width between an inner hole and an outer circle of the end ring is k9, and a q-axial radial width therebetween is k10, and it is satisfied that $1.1 \leq k9/k10 \leq 2.8$.

17. A self-starting synchronous reluctance motor, comprising a stator and the motor rotor according to claim 1.

18. The self-starting synchronous reluctance motor according to claim 17, wherein a width of an air gap formed between the rotor core and the stator is σ, and $0 \leq L < 8\sigma$.

* * * * *